Patented Oct. 5, 1937

2,094,868

UNITED STATES PATENT OFFICE 2,094,868

MOLDING COMPOUND

William L. Baxter, Marblehead, Mass., assignor to United Shoe Machinery Corporation, Paterson, N. J., a corporation of New Jersey No Drawing. Application August 15, 1935, Serial No. 36,348

5 Claims. (Cl. 106—22)

The present invention relates to a molding compound which can be molded under heat and pressure, and to a molded product.

In a large variety of articles, of which shoe lasts are examples, certain qualities are desirable. Such articles should be waterproof so that they will not disintegrate, crack or change shape when exposed to moisture; they should possess great strength; they should be capable of being machined and polished; and they should be strongly shatter-resistant. Molded articles which are waterproof, strong and capable of being machined and polished are in use, but such articles are so brittle that they shatter easily.

I have found that by using with a given amount of a suitable waterproof binder capable of being molded under heat and pressure a filler consisting of a proportionally large amount of raw sisal hemp fibers to form a molding compound, molded articles can be made which possess the desirable qualities indicated above. In particular, strong, hard articles can be produced which are exceedingly shatter-resistant and may consequently be roughly handled and struck heavy blows without being chipped, split or otherwise broken. It is also possible, as will appear below, to produce articles into which may be driven nails and other metallic fasteners.

Hitherto, vegetable fibers such as hemp intended for use in paper-making and in molding compounds have been subjected to a preliminary treatment including a cooking or digesting process which frees the fibers from encrusting matter and isolates more or less completely the individual fibers. Raw hemp fibers consist of bundles of smaller individual fibers encrusted with a cuticular envelop; and the usual treatment, referred to above, destroys the cuticular envelop and breaks up the bundles more or less completely into the individual fibers. In addition to the fact that the individual fibers thus freed are weaker than the natural bundles in their envelopes, the further disadvantages occurs that a greater quantity of a waterproof binder must be used to coat them than is necessary with the enveloped bundles. This is due to the facts (1) that the fibers can not be impregnated with a substance which is insoluble in water and hence must be coated with the waterproof binder, and (2) that the surface area of the individual fibers is greater than that of the natural bundles. Consequently, when individual fibers are employed, the percentage of binder which must be employed to produce a strong molded product is high, being ordinarily not less than 50% by weight of the product; and this large amount of binder not only involves an expense which may be prohibitive but renders the molded product so hard that it will not receive metallic fasteners, and so brittle that it possesses no great resistance to shattering. Molded articles possessing in a high degree the desirable qualities which have been mentioned above can be made from a molding compound (which may contain a plasticizer, coloring matter, etc.) in which the fibers comprise from 65 to 80% of the combined weight of the fibers and the binder. The large mass of fibers present modifies the hardness of the resulting article so that it can be rendered capable of receiving and holding metallic fasteners, and the strength of the fibers contributes to the shatter-resistant quality of the article.

The molding compound may conveniently be made by the following process. The fibers are put through a hammer mill to break them up into proper lengths, the lengths of the fibers in any given case depending upon the intricacy of the form of the article which is to be molded and the distance of flow during the molding. A mass of these fibers is dispersed in water and agitated with an aqueous emulsion of the binder. The emulsion is broken whereupon the binder is precipitated and caused to coat the fibers. Inasmuch as the finely divided binding material is subject to large losses in the subsequent removal of the water from the mass, and inasmuch as it is sticky and may cause much mechanical trouble by coating the screens and gumming the bearings of the machinery which is subsequently employed to remove the water from the mass of coated fibers, it is desirable at this point to add more uncoated fibers and to continue the agitation. The added fibers adhere to the coated fibers thus entrapping the precipitated binding material and rendering the mass of fibers substantially non-sticky or at least reducing the stickiness of the mass to a point at which it causes no trouble during the subsequent removal of water. In order to remove the water from the mass of coated fibers, this mass may be sheeted on a paper machine or wet machine or may be collected on the screen of the dewatering machine. The material is then thoroughly dried, and the dried material broken up in a hammer mill or a ball mill to suitable fineness to form a molding compound.

Specific examples are given below.

Example I 25 pounds of raw sisal hemp fibers cut into suitable lengths are placed in an agitator with 500 pounds more or less of water and agitated so as to disperse the fibers in the water. When the fibers are in the desired condition, 15 pounds of a vinyl resin in a water emulsion, produced for example by means of a solvent such as benzol which is not miscible with water and a soap such as ammonium oleate, are added. When the emulsion has been properly dispersed throughout the fibers, a coagulant such as aluminium sulphate is slowly added until the emulsion breaks and the water has a pH of about 5, being bright, clear and free from resin. Next, 10 pounds of fresh sisal hemp fibers are added and thoroughly commingled with the other fibers on which the resin was precipitated. The water is removed by sheating the mass of fibers on a paper machine, a dewater, a save-all or a rotary filter. The sheeted product is then dried, and the dry material is broken up in a hammer mill or a ball mill to suitable fineness.

*Example II*

35 pounds of raw sisal hemp fiber are dispersed in water. $16\tfrac{6}{10}$ pounds of shellac in a water emulsion are added and agitated with the dispersed fibers. The dispersion is broken by a coagulant, 15 pounds of fresh sisal fiber are added, and the process completed as in Example I.

*Example III*

70 pounds of raw sisal hemp fiber are dispersed in water. 50 pounds of manila copal nubs, and 10 pounds of a plasticiser, such as Barrett resin C, in a water emulsion are added and agitated with the dispersed fibers. The dispersion is broken by a coagulent. 30 pounds of fresh fiber are added, and the process completed as in Example I. It will be noted that in Example III, a plasticizer for the copal is used, namely Barrett resin C; and it should be understood that a suitable plasticiser may be used in any case where desired. In the three illustrative examples given above natural and synthetic resins have been used as binders. It should be understood however that any suitable binder, such for example as cellulose esters and rubber, may be employed.

From these and similarly made compounds, articles may be molded under heat and pressure. The strength, shatter-resistant quality and capability of receiving nails and similar metallic fasteners of the molded articles may be varied by varying the proportions of fiber used, by employing different binders or mixture of binders and by using different pressures during the molding operations. If an article such as a shoe last is to be made which must possess great resistance to crushing force as well as resistance to shattering, I prefer to employ a resinous binder consisting largely, if not entirely, of a vinyl resin, such for example as the resin, available under the trade name of "Gelva", which is polymerized vinyl acetate. A resinous binder, such as this one which is thermoplastic as distinguished from one which, although it may be once molded under heat, is set by the heat and can not be molded a second time, is very desirable in many cases. In the matter of shoe lasts this thermoplastic quality is particularly desirable. A shoe manufacturer requires a large number of lasts which have to be replaced frequently due to wear and to changes in the styles of shoes, so that a manufacturer's supply of lasts has always involved a large recurring expense. Lasts made according to the present invention and purchased by the manufacturer are, however, to a large extent an investment, since, when they become useless for any reason, they may be broken up in a stamp mill and the pieces put through a hammer mill to reduce them once more to a suitable molding compound from which new lasts may be made.

From the description given above it will be seen that the essential ingredients of the molding compound and the molded article are raw sisal hemp fibers and a suitable thermoplastic binder, it being understood that plasticizers, coloring matter, etc., may be used in addition if desired.

The method of making the compound which includes the addition of uncoated fibers to reduce the stickiness of the coated fibers is not claimed herein but forms the subject-matter of a separate application, Serial No. 37,604, filed August 23, 1935 in the name of William W. Carter.

Having described my invention, what I claim as new and desire to secure by Letters Patent of the United States is:

1. A dry molding composition consisting essentially of from 65% to 80% by weight of raw sisal hemp fibers broken into suitable lengths and a waterproof thermoplastic binder capable of being repeatedly molded under heat and pressure in sufficient quantity to form a shatter-resistant molded article.

2. A dry molding composition consisting essentially of from 65% to 80% by weight of raw sisal hemp fibers broken into suitable lengths and a vinyl resin in sufficient quantity to form a shatter-resistant molded article.

3. A dry molding composition consisting essentially of substantially 70% by weight of raw sisal hemp fibers and 30% by weight of a vinyl resin.

4. A molded article consisting essentially of raw sisal hemp fibers and a thermoplastic binder capable of being repeatedly molded under heat and pressure, the fibers constituting from 65% to 85% of the combined weight of the fibers and binder whereby the article is shatter-resistant.

5. A molded article consisting essentially of raw sisal hemp fibers and a vinyl resin capable of being molded repeatedly under heat and pressure, the fibers and resin being in relative proportion to produce an article which is shatter-resistant and is capable of securing and holding metallic fasteners.

WILLIAM L. BAXTER.